United States Patent
Hiruma et al.

(10) Patent No.: US 10,609,495 B2
(45) Date of Patent: Mar. 31, 2020

(54) HEARING AID

(71) Applicant: RION Co., Ltd., Kokubunji-shi, Tokyo (JP)

(72) Inventors: Nobuhiko Hiruma, Kokubunji (JP); Kazuteru Nishiyama, Kokubunji (JP)

(73) Assignee: RION Co., Ltd., Tokyo (JP)

( * ) Notice: Subject to any disclaimer, the term of this patent is extended or adjusted under 35 U.S.C. 154(b) by 0 days.

(21) Appl. No.: 16/245,120

(22) Filed: Jan. 10, 2019

(65) Prior Publication Data

US 2019/0222945 A1 Jul. 18, 2019

(30) Foreign Application Priority Data

Jan. 16, 2018 (JP) ................................ 2018-004585

(51) Int. Cl.
*H04R 25/00* (2006.01)
*H04M 1/725* (2006.01)

(52) U.S. Cl.
CPC ........ *H04R 25/554* (2013.01); *H04M 1/7253* (2013.01); *H04M 1/72591* (2013.01); *H04R 25/602* (2013.01); *H04R 25/70* (2013.01); *H04R 2225/55* (2013.01); *H04R 2225/61* (2013.01)

(58) Field of Classification Search
CPC ................ H04R 25/554; H04R 25/558; H04R 2225/51; H04R 2225/61; H04R 2460/03; H04R 1/1041
See application file for complete search history.

(56) References Cited

U.S. PATENT DOCUMENTS

| | | | | |
|---|---|---|---|---|
| 5,659,621 A * | 8/1997 | Newton | ............... | H04R 25/558 381/312 |
| 7,016,511 B1 * | 3/2006 | Shennib | ............... | H04R 25/558 381/315 |
| 7,369,671 B2 * | 5/2008 | Sacha | .................... | H04R 25/43 381/312 |
| 8,199,947 B2 * | 6/2012 | Rass | .................... | H04R 25/554 381/23.1 |
| 8,284,970 B2 * | 10/2012 | Sacha | .................... | H04R 25/43 381/315 |

(Continued)

FOREIGN PATENT DOCUMENTS

| | | | |
|---|---|---|---|
| JP | 2014090407 A | | 5/2014 |
| JP | 2015138985 A | | 7/2015 |
| WO | WO-2019029810 A1 * | 2/2019 | ........... H04R 25/558 |

OTHER PUBLICATIONS

Decision to Grant dated Sep. 4, 2018 for the corresponding Japanese Patent Application No. 2018-004585.

*Primary Examiner* — Matthew A Eason
(74) *Attorney, Agent, or Firm* — Rankin, Hill & Clark LLP

(57) ABSTRACT

A hearing aid provided which has: a battery; a control means which controls a function of the hearing aid, including a wireless communication; a power supply switch which switches between supply and block of power from the battery to the control means; and a magnetic switch connected to the control means, wherein: the control means proceed to a normal operation via a start-up process when power is supplied from the battery due to the power supply switch; and if the magnetic switch is on during the start-up process, the control means switches a wireless communication setting before proceeding to the normal operation.

8 Claims, 3 Drawing Sheets

(56) References Cited

U.S. PATENT DOCUMENTS

| | | | |
|---|---|---|---|
| 2010/0304676 A1* | 12/2010 | Heo | H04M 1/05 |
| | | | 455/41.3 |
| 2014/0087675 A1* | 3/2014 | Pedersen | H04R 25/554 |
| | | | 455/90.3 |
| 2014/0270300 A1* | 9/2014 | Michel | H04R 25/00 |
| | | | 381/329 |
| 2017/0374477 A1* | 12/2017 | Salvatucci | H04R 25/407 |
| 2018/0227684 A1* | 8/2018 | Ungstrup | H04M 1/7253 |

* cited by examiner

HEARING AID

CROSS-REFERENCE TO RELATED APPLICATION

This application claims priority from Japanese Patent Application No. 2018-004585 filed with the Japan Patent Office on Jan. 16, 2018, the entire content of which is hereby incorporated by reference.

BACKGROUND

1. Technical Field

The present invention relates to a hearing aid, and particularly to a hearing aid equipped with a wireless communication function.

2. Description of the Related Art

Hearing aids equipped with a function for wireless communication with other devices are known. The function may make it possible to operate the hearing aid from another device. For example, the volume of sound output from the hearing aid can be adjusted from the other device. When the hearing aid has a memory in which various parameters for changing the tone of output sound are stored, the output tone can be adapted to the surrounding environment by selectively switching the parameters stored in the memory, on the basis of a command from the other device, for example. In another example, when the other device has a telephone function or a music playback function, it may be possible to output call voice or music directly from the hearing aid. Further, when binaural hearing aids are worn, the hearing aids may be configured to perform wireless communication with each other so that adjusting the volume or tone of one hearing aid results in a corresponding adjustment in the other hearing aid.

In aircraft, use of devices having wireless communication functions may be limited for fear of interfering with safe flight. For example, wireless communication with devices outside the aircraft is generally prohibited. Even if the device on the other end of the wireless communication is within the aircraft, use of wireless communication may be prohibited, depending on the type of aircraft. Accordingly, it is necessary under such limitations to put a wireless communication function-equipped hearing aid in a state in which no radio waves are emitted therefrom.

A hearing aid can be put in a state in which emission of radio waves is stopped (hereafter referred to as flight mode). For example, if a structural switch that can be directly operated with a finger is provided on the hearing aid body, switching to flight mode may be performed by pressing and holding the structural switch, or by pressing plural such switches simultaneously. The switching to flight mode may also be performed by utilizing a battery cover as disclosed in JP-A-2014-90407. For example, the wireless communication function can be disabled while basic hearing aid operations of the hearing aid are maintained, in response to repeated opening and closing operations of the battery cover. Such a hearing aid is disclosed in JP-A-2014-90407.

SUMMARY

A hearing aid according to an embodiment of the present disclosure includes a battery; a control means which controls a function of the hearing aid, including a wireless communication; a power supply switch which switches between supply and block of power from the battery to the control means; and a magnetic switch connected to the control means, wherein: the control means proceeds to a normal operation via a start-up process when power is supplied from the battery due to the power supply switch; and if the magnetic switch is on during the start-up process, the control means switches a wireless communication setting before proceeding to the normal operation.

DESCRIPTION OF THE EMBODIMENTS

Figure 1A:
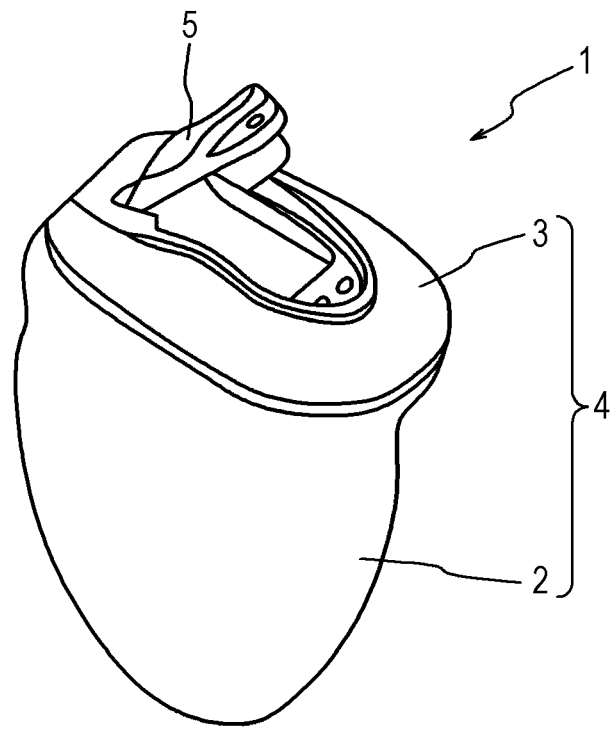
FIGS. 1A and 1B illustrate an embodiment of a hearing aid according to the present invention.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

However, hearing aids of in-the-ear type, small-size hearing aids of behind-the-ear type and the like are often not provided with structural switches for reasons of space. In such cases, switching to flight mode needs to be performed by other means. In addition, repeatedly opening and closing the battery cover, as described in JP-A-2014-90407, has problems such like increasing the probability of letting the battery fall; failing to clearly indicate whether the operation has been made correctly; and making operation cumbersome. Opening and closing the battery cover to switch on and off power supply to the hearing aid may result in an unintentional selection of the state in which no radio waves are emitted.

When wireless communication between a hearing aid and another device is performed using, for example, the Bluetooth (registered trademark) communication scheme, pairing is required to establish connection with the counterpart device in advance. In this case, a hearing aid provided with a structural switch may be able to change to a pairing mode for accepting pairing by, for example, pressing and holding the switch. Such means, however, may not be adoptable in the hearing aids of in-the-ear type, behind-the-ear type of small size, and the like, as noted above. It is possible to adopt a design such that, when power supply is switched on, the pairing-accepting state is entered before a normal operation is performed. This, however, would require performing the pairing operation each time connection is to be made, and be cumbersome.

The present invention addresses the solution to the problems discussed above. An object of the present invention is to provide a hearing aid with which various settings for wireless communication can be easily and reliably performed.

A hearing aid according to the present invention includes a battery; a control means which controls a function of the hearing aid, including a wireless communication function; a power supply switch which switches between supply and block of power from the battery to the control means; and a magnetic switch connected to the control means. The control means proceeds to a normal operation via a start-up process when power is supplied from the battery due to the power supply switch. When the magnetic switch is on during the start-up process, the control means switches a wireless communication setting before proceeding to the normal operation.

Preferably, the hearing aid may include a hearing aid body, and a battery cover configured to be opened and closed with respect to the hearing aid body and that the power supply switch may be configured to allow for supply of power to the control means when the battery cover is closed, and may be configured to block power to the control means when the battery cover is opened.

Preferably, the wireless communication function may be set to stop emission of radio waves with switching the wireless communication setting.

Connection for wireless communication is established with a counterpart device for performing the wireless communication with switching the wireless communication setting.

In the hearing aid according to the present invention, the need for switching power supply on and off by repeatedly opening and closing the battery cover, as is typically done, is eliminated. Accordingly, various settings for wireless communication can be easily and reliably performed, and the risk of dropping the battery can be reduced. In addition, the use of a magnetic switch makes it possible for the present invention to be applied in a small-sized hearing aid, and an unintentional switching to a state in which emission of radio waves is stopped is prevented.

In the following, an embodiment of a hearing aid according to the present invention will be described with reference to the drawings. FIG. 1 illustrates the hearing aid 1 according to the present embodiment. The hearing aid 1 is an in-the-ear type hearing aid and is provided with a hearing aid body 4 and a battery cover 5. The hearing aid body 4 includes a body case 2 and a face plate 3 which constitute an outer shell. The battery cover 5 is configured to be opened and closed with respect to the hearing aid body 4.

The hearing aid body 4 is provided with components, not illustrated, for performing basic operations of the hearing aid. The components may include a microphone for converting sound into an electric signal; a control means for processing the electric signal output from the microphone to adapt to the hearing acuity of the user; and an earphone for converting the electric signal processed by the control means into sound. The hearing aid body 4 is also provided with a memory in which various parameters for changing the tone of output sound are stored, and a wireless communication means for performing wireless communication with another device. Operations relating to the memory and the wireless communication means are also controlled by the control means.

The wireless communication means may use a wireless communication scheme such as Bluetooth (registered trademark) or near field communication (NFC), but is not limited to this. Other examples of wireless communication scheme include Wi-Fi and ZigBee (registered trademark).

Figure 1B:
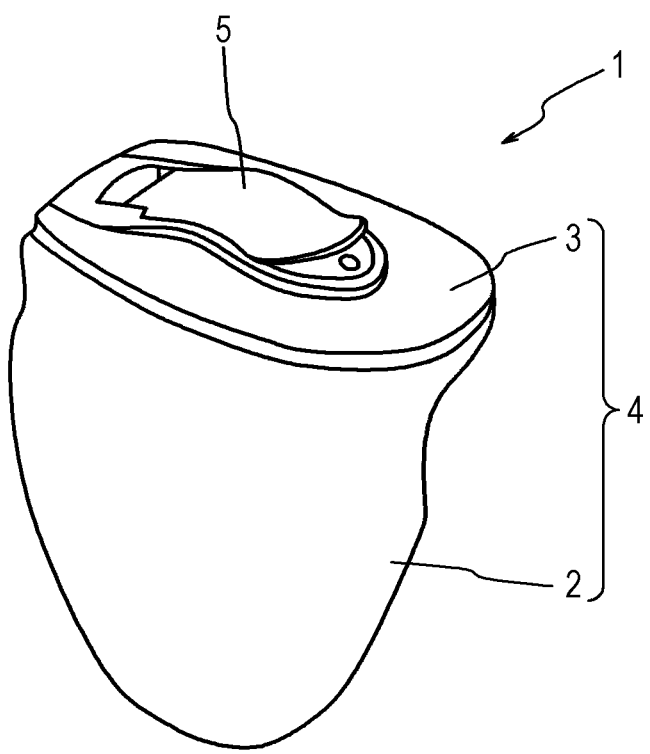

The hearing aid body 4 is also provided with a battery case in which a battery can be mounted by opening the battery cover 5. In the present embodiment, when the battery cover 5 is open, as illustrated in FIG. 1A, power to the control means is blocked. When a battery is housed in the battery case and the battery cover 5 is closed, as illustrated in FIG. 1B, power is supplied to the control means. The supply and block of power from the battery to the control means may be switched using various power supply switches, such as a switch that can be operated directly with a finger.

The hearing aid body 4 is further provided with a magnetic switch which is connected to the control means and switched on and off in accordance with a change in an external magnetic field. The magnetic switch may be based on various elements, such as an MR element in which the magnetoresistive effect is utilized; a Hall element in which the Hall effect is utilized; and a GMR element in which the giant magnetoresistive effect is utilized.

Figure 2:
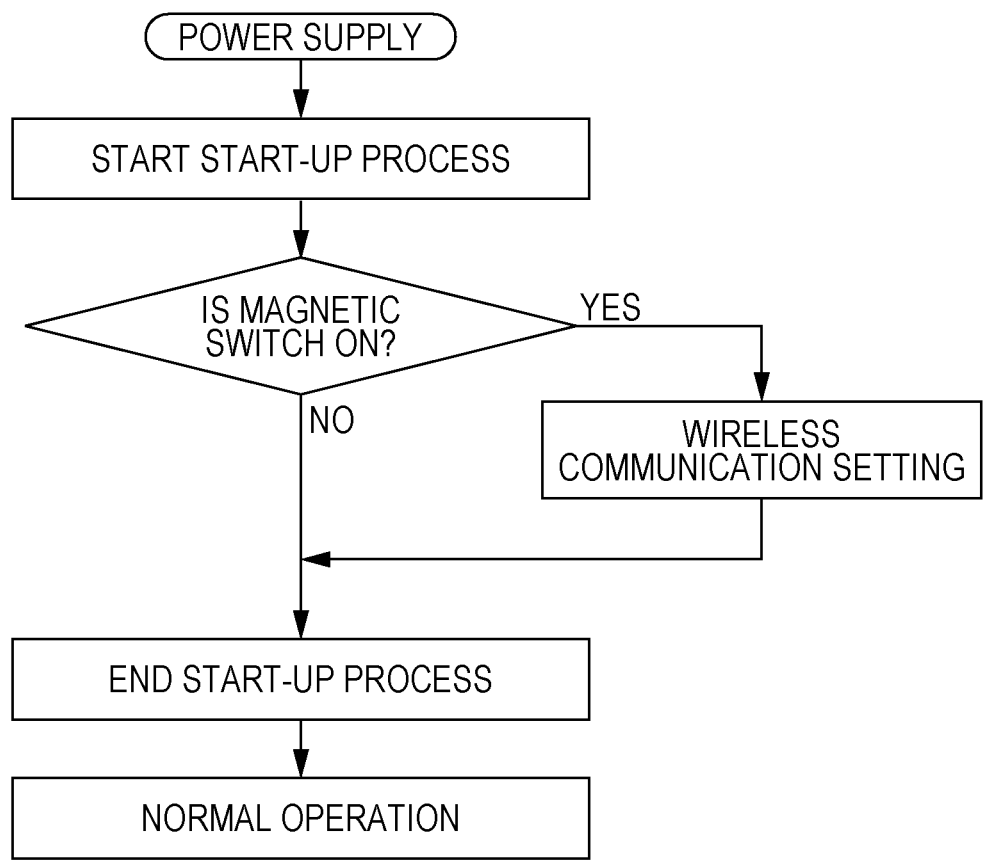
FIG. 2 is a flowchart illustrating the operation of a control means in the hearing aid according to the present invention.

With reference to FIG. 2, the operation of the control means will be described in greater detail. First, the control means is supplied with power from the battery. In the present embodiment, power is supplied from the battery by closing the battery cover 5 from open state. In the control means thus supplied with power, a start-up process is started. The start-up process includes reading various programming for performing a normal operation, for example. During the start-up process, the control means monitors whether the magnetic switch is on or off. If the magnetic switch is not turned on (i.e., if the magnetic switch remains off) before the end of the start-up process, a normal operation is started in which the function for performing wireless communication with another device is maintained.

In the present embodiment, the control means is configured to accept an operation from another connected device, using the wireless communication function. In this way, it becomes possible to call, on the basis of a command from the other device, various parameters relating to tone from the memory, and to switch the parameters, so that sound can be output in a tone suitable for the surrounding environment. It also becomes possible to adjust, from the other device, the volume of the sound being output. In addition, when the other device is a smartphone and the like having a telephone function or a music playback function, it may also be possible to output call voice or music from the hearing aid 1 directly. Further, when the other device is one of binaural hearing aids, the hearing aids may be configured such that, when the tone or volume for one hearing aid is adjusted, the other hearing aid is also adjusted in a coordinated manner.

The parameters for changing the tone may be switched by turning on and off the magnetic switch by, for example, bringing a magnet close to the hearing aid 1 worn on the ear during the normal operation. Even if the magnetic switch is turned on during the normal operation, a wireless communication setting which will be described later will not be switched.

On the other hand, as illustrated in FIG. 2, if the magnetic switch is on during the start-up process, the wireless communication setting is switched. Specifically, the hearing aid 1 before being worn is brought close to a magnet with the battery cover 5 open, and then the battery cover 5 is closed. Thus, the wireless communication setting can be switched by simply closing the battery cover 5 once with the hearing aid 1 located close to a magnet. Accordingly, the operation is simple, and the risk of dropping the battery is reduced. If a magnet is not nearby, the hearing aid 1 may be brought close to a speaker and the like in which a magnet is used, such as in a cell phone.

The wireless communication setting may be set to flight mode for stopping the emission of radio waves during the normal operation, assuming that the hearing aid 1 will be used in aircraft, for example. If it is necessary to perform pairing for establishing connection with a counterpart device in advance, as in the Bluetooth (registered trademark) wireless communication scheme, pairing with the counterpart may be accepted by switching the wireless communication setting.

After the switching of the wireless communication setting is completed, the start-up process also ends, and the operation proceeds to the normal operation. When the wireless communication setting has been set to flight mode, during the normal operation, the operation of the hearing aid 1 is maintained except for the function relating to wireless communication.

Even when set in flight mode, the parameters for changing the tone may be switched by turning the magnetic switch on and off by bringing a magnet close to the hearing aid 1 being worn on the ear, for example.

While an embodiment of the hearing aid according to the present invention has been described, the present invention is not limited to the foregoing embodiment and may include various modifications within the scope of the claims.

Figure 3A:
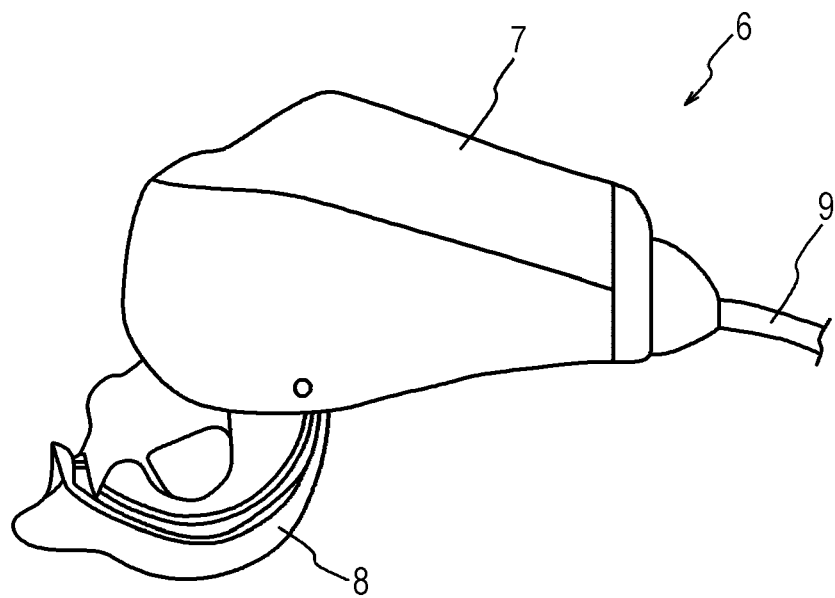
FIGS. 3A and 3B illustrate another embodiment of the hearing aid according to the present invention.
Figure 3B:
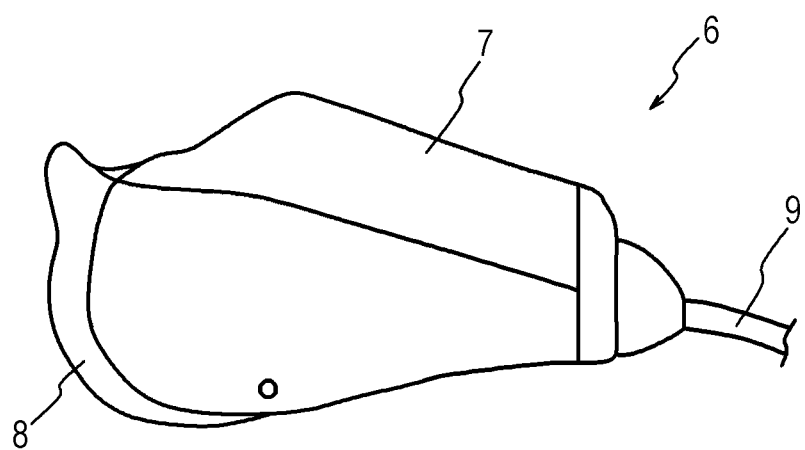

For example, the hearing aid according to the present invention is not limited to the in-the-ear type illustrated in FIG. 1, and may be a behind-the-ear type, as illustrated in FIGS. 3A and 3B, for example. The hearing aid 6 is provided with a hearing aid body 7, a battery cover 8 that can be opened and closed with respect to the hearing aid body 7, and a sound tube 9 which is connected to the hearing aid body 7 and has an ear chip (not illustrated) at the distal end thereof. The hearing aid body 7, similarly to the hearing aid body 4, is also provided with a memory, a wireless communication means, a magnetic switch and the like, in addition to a microphone, a control means, an earphone and the like. In the present embodiment, the battery is configured to be attached to the battery cover 8. In the hearing aid 6, too, the battery is attached to the battery cover 8 when open, as illustrated in FIG. 3A, and then the battery cover 8 is closed, as illustrated in FIG. 3B, whereby power is supplied from the battery to the control means. Unless a magnet is brought close during the start-up process, the hearing aid 6 proceeds to the normal operation in which the wireless communication function is maintained effective. The hearing aid 6 can be set to flight mode and the like by bringing a magnet close during the start-up process.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A hearing aid comprising:
   a battery;
   a control means which controls a function of the hearing aid, including a wireless communication function;
   a power supply switch which switches between supply and block of power from the battery to the control means; and
   a magnetic switch connected to the control means, wherein:
   the control means proceed to a normal operation via a start-up process when power is supplied from the battery due to the power supply switch;
   if the magnetic switch is on during the start-up process, the control means switches a wireless communication setting before proceeding to the normal operation;
   if the magnetic switch is not turned on before the end of the start-up process, the wireless communication setting is maintained and the control means proceeds from the start-up process to the normal operation; and
   a parameter for changing tone is switched by turning the magnetic switch on and off by bringing a magnet close to the hearing aid when the hearing aid is set to emit radio waves or not to emit radio waves.

2. The hearing aid according to claim 1, comprising:
   a hearing aid body; and
   a battery cover configured to be opened and closed with respect to the hearing aid body,
   wherein the power supply switch is configured to allow for supply of power to the control means when the battery cover is closed, and configured to block power to the control means when the battery cover is opened.

3. The hearing aid according to claim 1, wherein
   the wireless communication function is set to stop emission of radio waves with switching the wireless communication setting.

4. The hearing aid according to claim 2, wherein
   the wireless communication function is set to stop emission of radio waves with switching the wireless communication setting.

5. The hearing aid according to claim 1, wherein
   connection for wireless communication is established with a counterpart device for performing the wireless communication with switching the wireless communication setting.

6. The hearing aid according to claim 2, wherein
   connection for wireless communication is established with a counterpart device for performing the wireless communication with switching the wireless communication setting.

7. A hearing aid comprising:
   a battery;
   a control means which controls a function of the hearing aid, including a wireless communication function;
   a power supply switch which switches between supply and block of power from the battery to the control means; and
   a magnetic switch connected to the control means, wherein:
   the control means proceeds to a normal operation via a start-up process when power is supplied from the battery due to the power supply switch;
   if the magnetic switch is on during the start-up process, the control means switches a wireless communication setting before proceeding to the normal operation;
   if the magnetic switch is not turned on during the start-up process, the control means maintains the wireless communication setting before proceeding to the normal operation;
   a parameter for changing tone is switched by turning the magnetic switch on and off by bringing a magnet close to the hearing aid when the hearing aid is set to emit radio waves or not to emit radio waves.

8. A hearing aid comprising:
   a battery;
   a control means which controls a function of the hearing aid, including a wireless communication function;
   a power supply switch which switches between supply and block of power from the battery to the control means; and a magnetic switch connected to the control means,
wherein:
the control means proceeds to a normal operation via a start-up process when power is supplied from the battery due to the power supply switch;
if the magnetic switch is on during the start-up process, the control means switches a wireless communication setting before proceeding to the normal operation and then proceeds from the start-up process to the normal operation;
if the magnetic switch is not turned on during the start-up process, the control means maintains the wireless communication setting before proceeding to the normal operation and then proceeds from the start-up process to the normal operation; and
a parameter for changing tone is switched by turning the magnetic switch on and off by bringing a magnet close to the hearing aid when the hearing aid is set to emit radio waves or not to emit radio waves.

\* \* \* \* \*